United States Patent
Radosz et al.

(10) Patent No.: US 8,703,902 B2
(45) Date of Patent: *Apr. 22, 2014

(54) POLYMERS AND COPOLYMERS OF IONIC LIQUIDS AS RADIO FREQUENCY ABSORBING MATERIALS

(75) Inventors: Maciej Radosz, Laramie, WY (US); Youqing Shen, Laramine, WY (US); Huadong Tang, Laramie, WY (US)

(73) Assignee: University of Wyoming, Laramie, WY (US)

( * ) Notice: Subject to any disclaimer, the term of this patent is extended or adjusted under 35 U.S.C. 154(b) by 340 days.

This patent is subject to a terminal disclaimer.

(21) Appl. No.: 11/666,900

(22) PCT Filed: Nov. 10, 2005

(86) PCT No.: PCT/US2005/040651
§ 371 (c)(1),
(2), (4) Date: Nov. 19, 2007

(87) PCT Pub. No.: WO2006/053083
PCT Pub. Date: May 18, 2006

(65) Prior Publication Data
US 2008/0125559 A1    May 29, 2008

(51) Int. Cl.
C08G 79/02 (2006.01)
C08G 79/08 (2006.01)
C08G 79/14 (2006.01)
C07D 231/00 (2006.01)

(52) U.S. Cl.
USPC .......... 528/394; 528/395; 528/398; 528/482; 528/485; 526/239; 548/110; 564/291; 564/295; 568/9; 568/10; 568/11

(58) Field of Classification Search
USPC .......... 528/394, 395, 398, 482, 485; 526/239; 548/110; 564/291, 295; 568/9, 10, 11
See application file for complete search history.

(56) References Cited

U.S. PATENT DOCUMENTS

2004/0035293 A1 *   2/2004   Davis, Jr. .................. 95/140

OTHER PUBLICATIONS

Ding et al; Atom transfer radical polymerization of ionic liquid 2-91-Butylimidazolium-3-yl) ethyl methacrylate tetrafluoroborate; May 2004; Journal of Polymer Science; Part A: Polymer Chemistry; vol. 42, 5794-5801.*
Washiro et al; Highly ion conductive—ionic liquids, Polymer 45 (2004), 1577-1582.*
Claims of U.S. Appl. No. 11/659,484.*

* cited by examiner

*Primary Examiner* — Duc Truong
(74) *Attorney, Agent, or Firm* — Davis, Brown, Koehn, Shors & Roberts, P.C.; Kent A. Herink

(57) ABSTRACT

Polymerizable ionic liquid monomers and their corresponding polymers (poly(ionic liquid)s) are created and found to exhibit high absorption of radio frequency electromagnetic radiation, particularly in the microwave and radar bands. These materials are useful for coating objects to make them less reflective of radio frequency radiation and for making objects that absorb radio frequency radiation and are of minimal reflectivity to radio frequency radiation. Free-radical and condensation polymerization approaches are used in the preparation of the poly(ionic liquids).

10 Claims, 7 Drawing Sheets

(a)

b)

c)

(a)

b)

c)

(1) 2-bromoethanol
(2) 1-butyl imidazole
(3) NaBF₄

[MABI][Br]   [MABI][BF₄]

1: [BHEDMA][BF4]   2: [BMIMP][BF4]   3: [BBIMP][BF4]

POLYMERS AND COPOLYMERS OF IONIC LIQUIDS AS RADIO FREQUENCY ABSORBING MATERIALS

BACKGROUND OF THE INVENTION

The invention relates generally to ionic polymers and copolymers made from ionic liquids, referred to herein as poly(ionic liquid)s, and, more specifically, to ionic polymers and copolymers used to absorb electromagnetic energy in the radio frequency band, particularly microwave and radar band radiation.

Ionic liquids, which are organic salts that become liquids usually below about 250° C., have attracted attention because of their unique chemical and physical properties and a wide application potential [Huddleston, J. G.; Willauer, H. D.; Swatloski, R. P.; Rogers, R. D. Chem Commun 1998, 16, 1765-1766; Wasserscheid, P.; Keim, W. Angew Chem Int Ed 2000, 39, 3772-3789; Welton, T. Chem Rev 1999, 99, 2071-2084; Rogers, R. D. and Seddon, K. R. (ed), Ionic Liquids as Green Solvents: Progress and Prospects, American Chemical Society: Washington, D.C., 2003; Ding, J.; Zhou, D.; Spinks, G.; Wallace, G; Forsyth, S.; Forsyth, M.; MacFarlane, D. Chem. Mater 2003; 15, 2392-2398; Liang, C.; Yuan, C-Y.; Warmack, R. J.; Barnes, C. E. and Dai, S. Anal Chem 2002, 74, 2172-2176; Pernak, J.; Czepukowicz, A.; Poź niak, R. Ind Eng Chem Res 2001, 40, 2379-2383].

Conventional liquids are molecular, being constituted of molecules, regardless of whether they are polar or non-polar. Ambient temperature ionic liquids are comprised of ions that allow them to behave in a very different manner to conventional molecular liquids when they are used as solvents. The physical properties of ionic liquids can be very different from conventional liquids and by combining different anions and cations in an ionic liquid it is possible to synthesize a library of different ionic liquids each with specific properties.

Microwave absorbing materials have many applications such as noise suppression materials in data transmission, mines detection, artificial human tissue, and radar absorbing materials in military applications. Polymeric materials are of especial interest because of their light weight, easy application and easy fabrication into various shapes such as coating. However, no conventional polymer has been found to have strong microwave absorption properties. Accordingly, it would be advantageous to provide a polymeric material that can be easily manufactured and formed into a variety of shapes that also has a high absorbance of microwave type and other radio frequency radiation.

SUMMARY OF THE INVENTION

The invention consists of polymers and copolymers of ionic liquid monomers that have been designed to have high radiation absorbance characteristics in a desired radio frequency range, most preferably in microwave and radar frequencies. The absorbance characteristics of the poly(ionic liquid) will be dependent on the constituent anions and cations which form the polymers or copolymers. By selecting the appropriate constituents, the polymers and copolymers are formed with a desired arrangement of segments (repeat units) of the selected polarity to provide for the high absorbance of radiation. The polymers and copolymers additionally will have the bulk physical properties of a polymeric material and so can be molded by conventional techniques into virtually any desired shape. The polymeric materials also may be simply applied as coatings, again by conventional techniques developed for other polymers.

The ionic liquid monomers include but are not limited to: (a) Imidazolium-based ionic liquids, such as (a) 1-[2-(methacryloyloxy)ethyl]-3-butyl-imidazolium tetrafluoroborate ([MABI][$BF_4$]), 1-(p-vinylbenzyl)-3-butyl-imidazolium tetrafluoroborate ([VBBI][$BF_4$]), 1-(p-vinylbenzyl)-3-methyl-imidazolium tetrafluoroborate [VBMI][$BF_4$], 1-(p-vinylbenzyl)-3-butyl-imidazolium hexafluorophosphate [VBBI][$PF_6$], 1-(p-vinylbenzyl)-3-butyl-imidazolium o-benzoic sulphimide ([VBBI][Sac]), 1-(p-vinylbenzyl)-3-butyl-imidazolium trifluoromethane sulfonamide ([VBBI][$BF_4$]), and (1-butylimidazolium-3)methyl-ethylene oxide ([BIEO][$BF_4$]); (b) Ammonium-based ionic liquids, such as (p-vinylbenzyl)trimethyl ammonium tetrafluoroborate ([VBTMA][$BF_4$]), (p-vinylbenzyl)triethyl ammonium tetrafluoroborate ([VBTEA][$BF_4$]), (p-vinylbenzyl)tributyl ammonium tetrafluoroborate ([VBTBA][$BF_4$]), 2-(methacryloyloxy)ethyl-trimethylamnonium tetrafluoroborate ([MATMA][$BF_4$]), (p-vinylbenzyl)trimethyl ammonium hexafluorophosphate ([VBTMA][$PF_6$]), (p-vinylbenzyl)trimethyl ammonium o-benzoic sulphimide ([VBTMA][Sac]), and (p-vinylbenzyl)trimethyl ammonium trifluoromethane sulfonamide ([VBTMA][$Tf_2N$]); (c) Phosphonium-based ionic liquids, such as (p-vinylbenzyl)triethyl phosphonium tetrafluoroborate ([VBTEP][$BF_4$]), and (p-vinylbenzyl)triphenyl phosphonium tetrafluoroborate ([VBTPP][$BF_4$]); (d) Pyridinium-based ionic liquids, such as 1-(p-vinylbenzyl) pyridinium tetrafluoroborate ([VBP][$BF_4$]); and (e) Condensation polymerization ionic monomers, such as bis(2-hydroxyethyl)dimethyl ammonium tetrafluoroborate ([BHEDMA][$BF_4$]), 2,2-bis(methylimidazolium methyl)-1,3-propanediol tetrafluoroborate ([BMIMP][$BF_4$]), and 2,2-bis(butylimidazolium methyl)-1,3-propanediol tetrafluoroborate ([BBIMP][$BF_4$]).

DETAILED DESCRIPTION OF PREFERRED EMBODIMENTS

Figure 1:
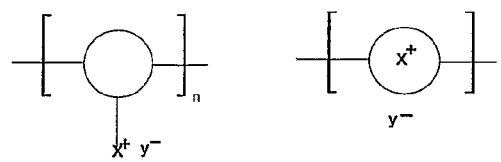
FIG. 1a is a scheme of the general structure of poly(ionic) liquids.
FIG. 1b is a scheme of an example of cations of poly(ionic) liquids.
FIG. 1c is a scheme of an example of anions of poly(ionic) liquids.
Figure 1:
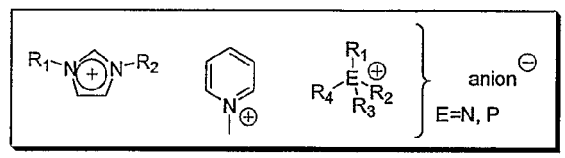
Figure 1:
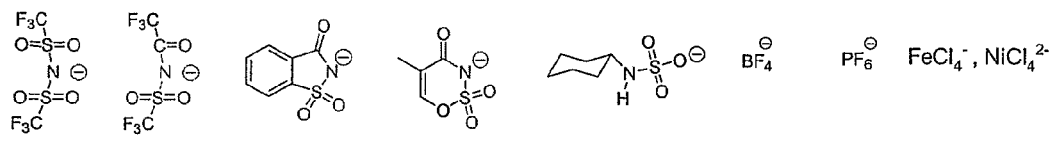

In this description, each material is introduced by its full chemical name followed by a shortened name in parenthesis, for example, 1-[2-(methacryloyloxy)ethyl]-3-butyl-imidazolium tetrafluoroborate ([MABI][BF$_4$]). Following the initial introduction, only the shortened name is used.

Ionic liquids are organic salts with melting points usually below 250° C., often below room temperature. They can be substitutes for the traditional organic solvents in chemical reactions. Ionic liquid monomers are compounds containing cation(s) and anion(s) that can be polymerized into high molecular weight polymers by radical polymerization, condensation polymerization or other polymerization technique. Such polymers are referred to as poly(ionic liquids). The most common examples are imidazolium and pyridinium derivatives, but phosphonium or tetralkylammonium compounds have also been explored. Specific examples of ionic liquid monomers used for polymer synthesis and other applications include but are not limited to:

(1) Ionic liquid monomers based on imidazolium, such as 1-[2-(methacryloyloxy)ethyl]-3-butyl-imidazolium tetrafluoroborate ([MABI][BF$_4$]), 1-(p-vinylbenzyl)-3-butyl-imidazolium tetrafluoroborate ([VBBI][BF$_4$]), 1-(p-vinylbenzyl)-3-methyl-imidazolium tetrafluoroborate ([VBMI][BF$_4$]), 1-(p-vinylbenzyl)-3-butyl-imidazolium hexafluorophosphate ([VBBI][PF$_6$]), 1-(p-vinylbenzyl)-3-butyl-imidazolium o-benzoic sulphimide ([VBBI][Sac]), 1-(p-vinylbenzyl)-3-butyl-imidazolium trifluoromethane sulfonamide ([VBBI][BF$_4$]), (1-butylimidazolium-3)methyl-ethylene oxide ([BIEO][BF$_4$]);

(2) Ionic liquid monomers based on ammonium, such as (p-vinylbenzyltrimethyl) ammonium tetrafluoroborate ([VBTMA][BF$_4$]), (p-vinylbenzyl)triethyl ammonium tetrafluoroborate ([VBTEA][BF$_4$]), (p-vinylbenzyl)tributyl ammonium tetrafluoroborate ([VBTBA][BF$_4$]), [2-(methacryloyloxy)ethyl]trimethylamnonium tetrafluoroborate ([MATMA][BF$_4$]), (p-vinylbenzyl)trimethyl ammonium hexafluorophosphate ([VBTMA][PF$_6$]), (p-vinylbenzyl)trimethyl ammonium o-benzoic sulphimide ([VBTMA][Sac]), (p-vinylbenzyltrimethyl) ammonium trifluoromethane sulfonamide ([VBTMA][Tf$_2$N]);

(3) Ionic liquid monomers based on phosphonium, such as (p-vinylbenzyl)triethyl phosphonium tetrafluoroborate ([VBTEP][BF$_4$]), (p-vinylbenzyl)triphenyl phosphonium tetrafluoroborate ([VBTPP][BF$_4$]);

(4) Ionic liquid monomers based on pyridinium, such as 1-(p-vinylbenzyl) pyridinium tetrafluoroborate ([VBP][BF$_4$]);

(5) Ionic liquid monomers for condensation polymerization, such as bis(2-hydroxyethyl)dimethyl ammonium tetrafluoroborate ([BHEDMA][BF$_4$]), 2,2-bis(methylimidazolium methyl)-1,3-propanediol tetrafluoroborate ([BMIMP][BF$_4$]), and 2,2-bis(butylimidazolium methyl)-1,3-propanediol tetrafluoroborate ([BBIMP][BF$_4$]).

Free radical polymerization is a common and useful reaction for making polymers from vinyl monomers, that is, from small molecules containing carbon-carbon double bonds. Polymers made by free radical polymerization include polystyrene, poly(methyl methacrylate), poly(vinyl acetate) and branched polyethylene. Free radical polymerization begins with a molecule called an initiator; common initiators are benzoyl peroxide or 2,2'-azo-bis-isobutyrylnitrile (AIBN).

A general structure of poly(ionic liquid)s is shown in FIG. 1a. The ionic units $X^+Y^-$ can be in the polymer backbone or in the side chains. $X^+$ is a cation and $Y^-$ is an anion generally used in unpolymerized ionic liquids. For example, anions can be selected from but not limited to amides, imides, sulfates, sulfonates, and metal-containing anions, such as $FeCl_4^-$ and $NiCl^{2-}$. Cations can be selected from but not limited to monosubstituted imidazoliums, disubstituted imidazoliums, trisubstituted imidazoliums, pyridiniums, pyrrolidiniums, phosphoniums, ammoniums, guanidiniums, and isouroniums. A few cation structure examples are shown in FIG. 1b and a few anion structure examples are shown in FIG. 1c. Each repeat-unit may contain zero to several $X^+Y^-$ units. These units may be of different type, and may have different positions.

Figure 2:
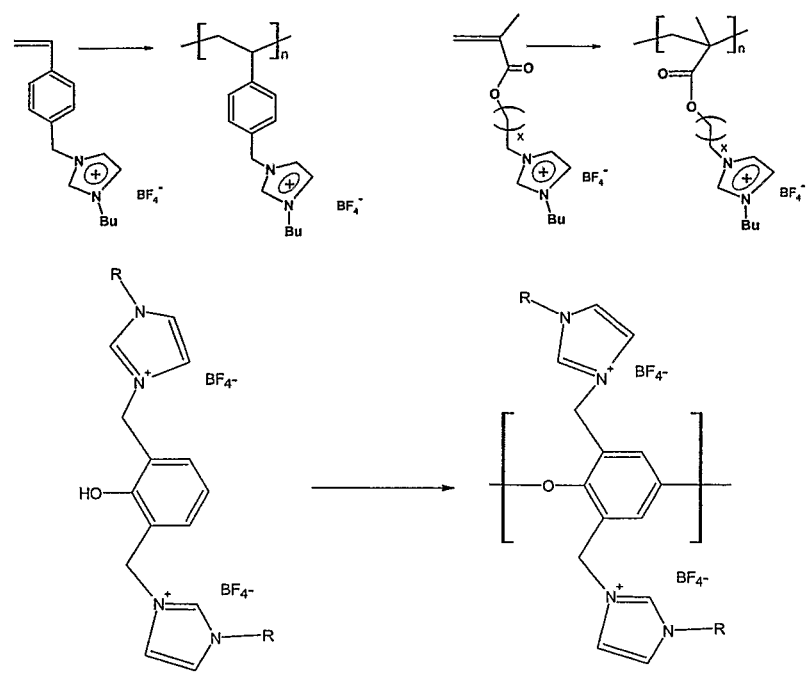
FIG. 2 is a scheme of homopolymer synthesis by radical polymerization or condensation polymerization with exemplary structures.
Figure 3:
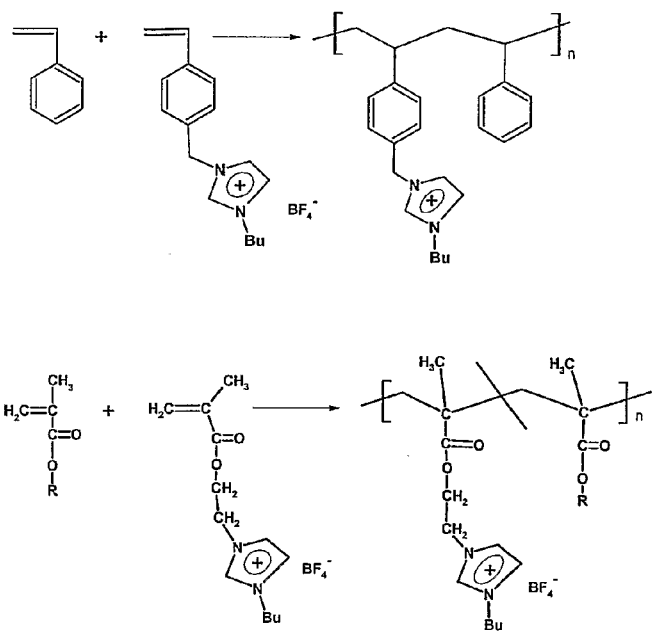
FIG. 3 is a scheme of ionic copolymer synthesis with exemplary structures.

FIG. 2 shows homopolymer synthesis by radical polymerization or condensation polymerization and structure examples and FIG. 3 shows copolymer synthesis and structure examples. The copolymers are obtained by copolymerizing ionic and nonionic monomers. In general, such ionic polymers are thermally stable, much more so than most plastics. For example, Polymer 1 (FIG. 2) is stable up to about 300° C.

Example 1

Materials

4-Vinylbenzyl chloride, methacryloyl chloride, 1-butyl-imidazole, 2-bromoethanol, lithium trifluoromethane sulfonimide, potassium hexafluorophosphate, sodium tetrafluoroborate, 2,6-di-tert-butyl-4-methyl phenol (DBMP), 2,2'-azobisisobutyronitrile (AIBN), aluminum isopropoxide, epichlorohydrin, N,N-dimethylformamide (DMF), acetonitrile, and acetone were purchased from Aldrich. 1-Methylimidazole, and o-benzoic sulphimide sodium salt hydrate were purchased from Lancaster Synthesis Inc. These chemicals were used without further purification.

Synthesis and Characterization

Figure 4:
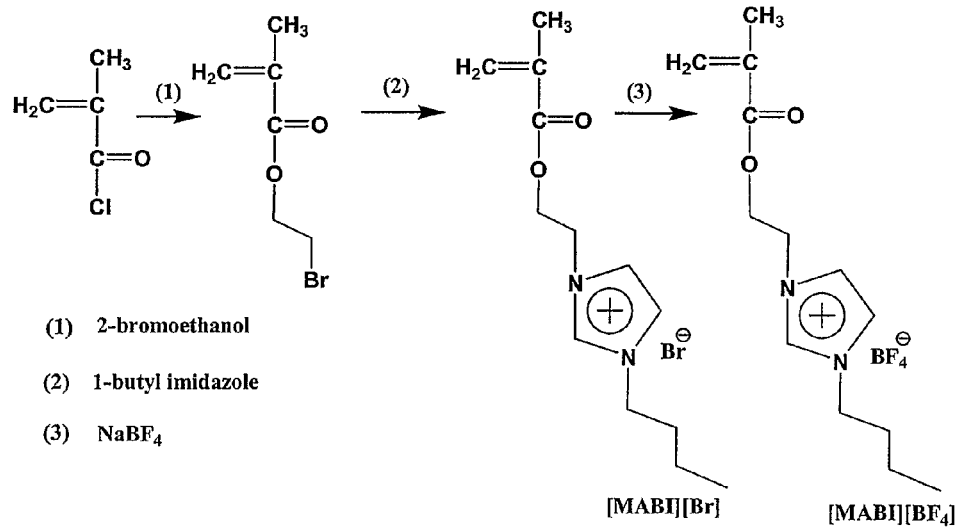
FIG. 4 is a scheme of the synthesis of 1-[2-(Methylacryloyloxy)ethyl]-3-butyl-imidazolium tetrafluoroborate ([MABI][$BF_4$]).
Figure 5:
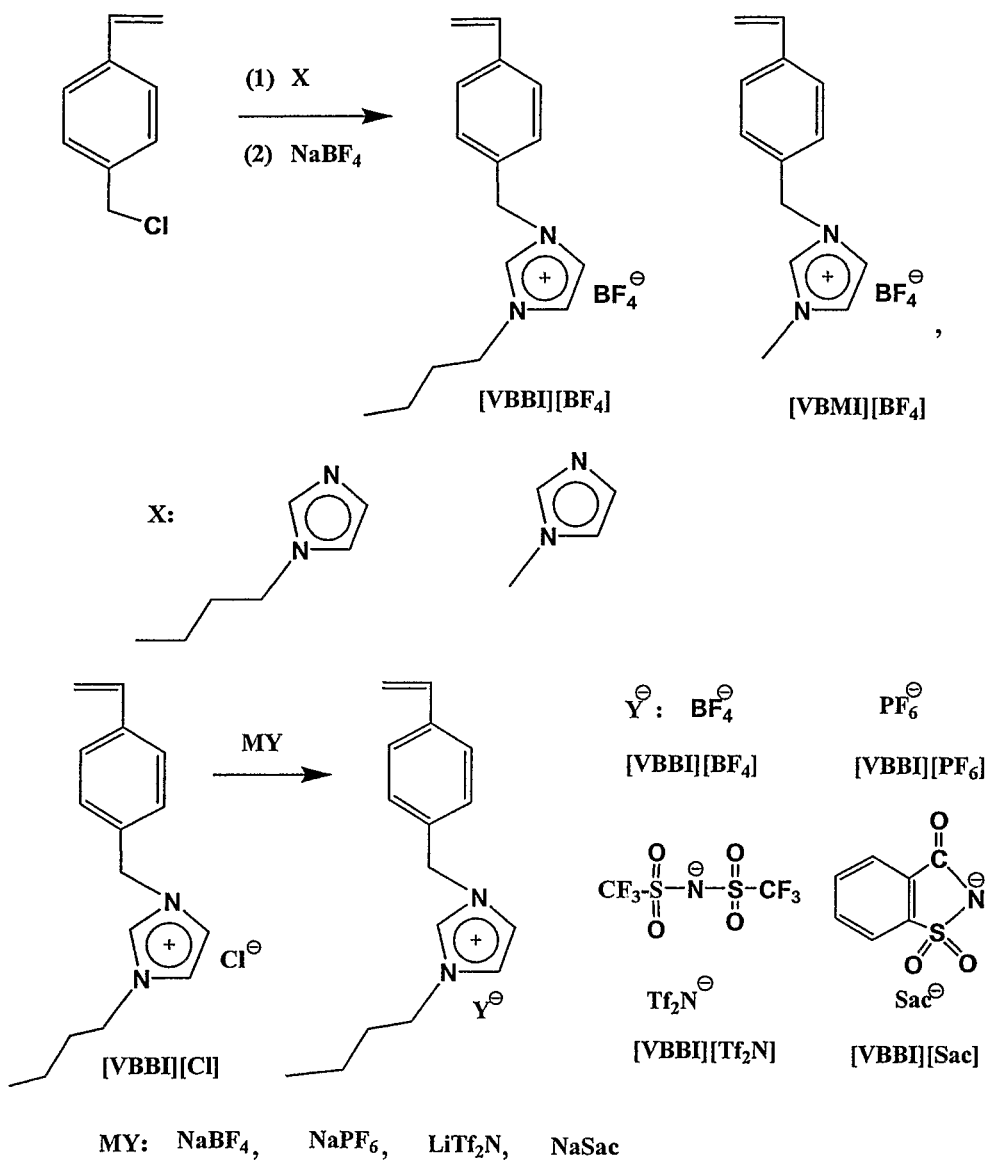
FIG. 5 is a scheme of the synthesis of 1-(p-vinylbenzyl)-3-butyl-imidazolium tetrafluoroborate ([VBBI][$BF_4$]).

1-[2-(Methylacryloyloxy)ethyl]-3-butyl-imidazolium tetrafluoroborate ([MABI][BF$_4$]) and 1-(p-vinylbenzyl)-3-butyl-imidazolium tetrafluoroborate ([VBBI][BF$_4$]) were synthesized according to our published reports [Ding, S.; Tang, H. Radosz, M.; Shen, Y. J Polym Sci Part A: Poly Chem 2004, 42, 5794-5801; Tang, H.; Tang, J.; Radosz, M.; Shen, Y. J Polym Sci Part A: Poly Chem 2005, 43, 1432-1443], as shown in FIGS. 4 and 5. 1-(p-Vinylbenzyl)-3-butyl-imidazolium hexafluorophosphate ([VBBI][PF$_6$]), 1-vinylbenzyl)-3-butyl-imidazolium o-benzoic sulphimide ([VBBI][Sac]), 1-(p-vinylbenzyl)-3-butyl-imidazolium trifluoromethane sulfonamide ([VBBI][Tf$_2$N]) were synthesized by a similar procedure except using NaPF$_6$, o-benzoic sulphimide sodium salt hydrate (NaSac) or lithium trifluoromethane sulfonamide (LiTf$_2$N) for anion exchange reactions. The yields were 93.0%, 49.6%, 39.9%, respectively.

1-(p-Vinylbenzyl)-3-methyl-imidazolium tetrafluoroborate ([VBMI][BF$_4$]) was synthesized as follows: To a 50 ml flask, p-vinylbenzyl chloride (10 ml, 0.064 mole), a small amount of DBMP, and 1-methylimdazole (5.14 ml, 0.064 mole) were added and heated at 45° C. overnight. The solution became gradually viscous. NaBF$_4$ (5.2 g, 0.47 mole) and dry acetone (30 ml) were added. The mixture was stirred at room temperature. The viscous liquid dissolved gradually while a white solid precipitated. After 12 h reaction, the precipitate was removed by filtration. The solvent was removed under vacuum. The solid was washed with water and ether, and dried by vacuuming at room temperature, producing 14 g of white crystals (yield 76.5%).

[VBBI][BF$_4$]: $^1$H NMR (400 MHz, DMSO-d$_6$, ppm): δ 9.24 (1H, s), 7.80 (2H, s), 7.51 (2H, d) 7.35 (2H, d), 6.73 (1H, m), 5.89 (1H, d) 5.27 (1H, d), 5.40 (2H, s), 4.14 (2H, t), 1.78 (2H, m), 1.24 (2H, m), 0.88 (3H, t). mp: 67-68° C.

[VBBI][PF$_6$] $^1$H NMR (400 MHz, DMSO-d$_6$, ppm): δ 9.22 (1H, s), 7.80 (2H, s), 7.48 (2H, d) 7.35 (2H, d), 6.73 (1H, m), 5.89 (1H, d), 5.30 (1H, d), 5.46 (2H, s), 4.14 (2H, t), 1.79 (2H, m), 1.22 (2H, m), 0.87 (3H, t). mp: 87-88.5° C.

[VBBI][Sac] $^1$H NMR (400 MHz, DMSO-d$_6$, ppm) δ 9.38 (1H, s), 7.80 (2H, s) 7.66 (1H, d), 7.61 (1H, d), 7.59 (2H, d), 7.49 (2H, d), 7.40 (2H, d), 6.72 (1H, m) 5.84 (1H, d), 5.42 (2H, s), 5.26 (2H, d) 4.16 (2H, m) 1.73 (2H, m), 1.21 (2H, m), 0.84 (3H, m). mp: −36−−38° C.

[VBBI][Tf$_2$N] $^1$H NMR (400 MHz, DMSO-d$_6$, ppm): δ 8.83 (1H, s), 7.44 (2H, s), 7.34 (2H, d) 7.27 (2H, d), 6.70 (1H, m), 5.79 (1H, d) 5.33 (1H, d), 5.31 (2H, s), 4.17 (2H, t), 1.84 (2H, m), 1.35 (2H, m), 0.94 (3H, t). mp: −61−−62° C.

[VBMI][BF$_4$]: $^1$H NMR (400 MHz, DMSO-d$_6$, ppm): 9.13 (1H, s), 7.71 (1H, s), 7.63 (1H, s), 7.52 (1H, d), 7.42 (2H, d), 6.75 (1H, m), 5.88 (1H, d), 5.41 (2H, s), 5.26 (1H, d), 3.86 (3H, s). mp: 42-44° C.

Poly(ionic liquid)s were prepared from above ionic liquid monomers by free radical polymerization. A typical example is as the following: [VBBI][BF$_4$] (3 g), AIBN (30 mg) and DMF (3 ml) were charged into a reaction tube. The tube was tightly sealed, and degassed. It was immersed in an oil bath at 60° C. for 6 h. The solution was poured into methanol to precipitate out the polymer. The polymer was dried under vacuum at 100° C. The yield was 2.3 g (75%).

Poly[1-(p-Vinylbenzyl)-3-butyl-imidazolium tetrafluoroborate] (P[VBBI][BF$_4$]): $^1$H NMR (DMSO-d$_6$, 400 MHz, ppm): δ 9.12 (s, 1H), 7.8 (br, 1H), 7.4 (br, 1H), 7.1 (br, 2H), 6.4 (br, 2H), 5.6-4.9 (br, 2H), 4.1 (br, 2H), 2.1-1.0 (m, 7H), 0.8 (s, 3H). Anal. Calcd for (C$_{16}$H$_{21}$BF$_4$N$_2$)n: C, 58.56%; H, 6.45%; N, 8.54%. Found: C, 58.35%; H, 6.43%; N, 8.50%.

Poly(1-Vinylbenzyl)-3-butyl-imidazolium hexafluorophosphate] (P[VBBI][PF$_6$]): $^1$H NMR (DMSO-d$_6$, 400 MHz, ppm): δ 9.16 (s, 1H), 7.72 (br, 1H), 7.47 (br, 1H), 7.04 (br, 2H), 6.42 (br, 2H), 5.23 (br, 2H), 4.15 (br, 2H), 2.1-0.8 (m, 10H) Anal. Calcd for (C$_{16}$H$_{21}$F$_6$N$_2$P)$_n$: C, 49.75%; H, 5.48%; N, 7.25%. Found: C, 49.70%; H, 5.37%; N, 7.12%.

Poly[1-(p-Vinylbenzyl)-3-butyl-imidazolium o-benzoic sulphimide] (P[VBBI][Sac]): $^1$H NMR (DMSO-d$_6$, 400 MHz, ppm): δ 9.44 (s, 1H), 7.5-7.9 (br, 6H), 7.19 (br, 2H), 6.35 (br, 2H), 5.35 (br, 2H), 4.15 (br, 2H), 1.9-0.5 (m, 10H) Anal. Calcd for (C$_{23}$H$_{25}$N$_3$O$_3$S)$_n$: C, 65.25; H, 5.91; N, 9.93. Found: C, 64.11; H, 6.05; N, 9.68.

Poly[1-(p-Vinylbenzyl)-3-butyl-imidazolium trifluoromethane sulfonamide] (P[VBBI][Tf$_2$N]): $^1$H NMR (DMSO-d$_6$, 400 MHz, ppm): δ 9.20 (s, 1H), 7.73 (br, 1H), 7.44 (br, 1H), 6.94 (br, 2H), 6.33 (br, 2H), 5.19 (br, 2H), 4.13 (br, 2H), 2.0-1.0 (m, 7H), 0.81 (s, 3H). Anal. Calcd for (C$_{18}$H$_{21}$N$_3$F$_6$O$_4$S$_2$)$_n$: C, 41.46; H, 4.03; N, 8.06. Found: C, 41.46; H, 4.13; N, 7.94.

Poly{1-[2-(Methylacryloyloxy)ethyl]-3-butyl-imidazolium tetrafluoroborate} (P[MABI][BF$_4$]): $^1$H NMR (DMSO-d$_6$, 400 MHz, ppm): δ 9.1 (br, 1H), 7.9-7.6 (d, 2H), 4.8-3.8 (m 6H), 2.0-0.2 (m, 12H). Anal. Calcd for (C$_9$H$_{18}$BF$_4$NO$_2$)$_n$: C, 48.17H, 6.49; N, 8.65. Found: C, 47.68; H, 6.48; N, 6.48.

Poly[1-(p-vinylbenzyl)-3-methyl-imidazolium tetrafluoroborate] (P[VBMI][BF$_4$]): $^1$H NMR (DMSO-d$_6$, 400 MHz, ppm): δ 9.10 (1H, br), 7.60~7.30 (2H, br), 7.10 (2H, br), 6.40 (2H, br), 5.30 (2H, br), 3.70 (2H, br) 2.1~0.5 (3H, br). Anal. Calcd for (C$_{13}$H$_{15}$BF$_4$N$_2$)$_n$: C, 54.58; H, 5.25; N, 9.80. Found: C, 52.74; H, 5.33; N, 9.38.

Figure 6:
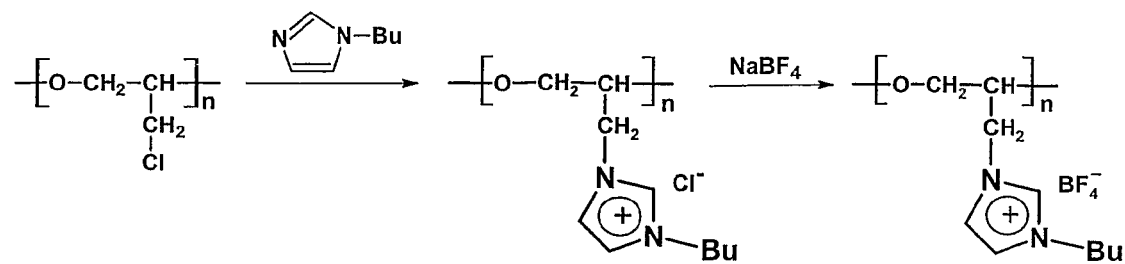
FIG. 6 is a scheme of the synthesis of a poly(ionic liquid) with poly(ethylene oxide) backbone and poly(epichlorohydrin).

The poly(ionic liquid) with poly(ethylene oxide) backbone was synthesized from poly(epichlorohydrin) (FIG. 6). Aluminum isopropoxide (0.18 g, 0.88 mmol) was added into a 100 mL flask. The flask was degassed by repeated vacuum/nitrogen purging (5 cycles). Degassed THF (25 mL) and epichlorohydrin (5.0 mL, 66 mmol) was added by degassed syringes. After the reaction flask was immersed into a 40° C. oil bath for 12 hours, the poly(epichlorohydrin) was precipitated out by adding a large amount of hexane. 3.3 g of poly (epichlorohydrin) was dissolved in 50 mL of DMF. N-butylimidazole (5.0 g, 40 mmol) was added to the DMF solution. This solution was stirred at 80° C. for 5 days, and then NaBF$_4$ (4.4 g, 40 mmol) was added. After the mixture was stirred at room temperature for 2 days, sodium chloride precipitate was removed by filtration. Anhydrous ethyl ether was added to the filtrate to precipitate the poly(ionic liquid). The obtained P[BIEO][BF$_4$] was washed with ethyl ether and dried in vacuum oven at 50° C. for one day. $^1$H-NMR (acetone-d$_6$): δ 8.86 (1H, s), 7.69 (2H, br), 4.44-4.31 (4H, br), 3.97 (1H, br), 3.67 (2H, br), 1.88 (2H, br), 1.34 (2H, br), 0.93 (3H, br). Anal. Calcd for (C$_{10}$H$_{17}$BF$_4$N$_2$O)$_n$: C, 44.80; H, 6.34; N, 10.46. Found: C, 44.66; H, 6.26; N, 10.11.

The syntheses of ionic liquid monomers are shown in FIGS. 3-6. Two steps were generally involved in the preparations: the quaternization reaction of 1-butylimidazole or 1-methylimidazole with 4-vinylbenzyl chloride or 2-bromoethyl methacrylate, and the anion exchange reaction of the halide ions with tetrafluoroborate, hexafluorophosphate, Sac or Tf$_2$N anions.

The quaternization with 4-vinylbenzyl chloride was fast with a high yield. The anion exchange of the resulting chloride [VBBI][Cl] and [VBMI][Cl] with BF$_4^-$ produced the monomers, [VBBI][BF$_4$] and [VBMI][BF$_4$], as crystalline solids, which are soluble in acetone, acetonitrile, dichloromethane, DMF, and DMSO, but insoluble in diethyl ether. [VBBI][PF$_6$] is also a solid with similar solubility. [VBBI] [Sac] and [VBBI][Tf$_2$N] are liquid at room temperature and soluble in acetone, acetonitrile, DMF, and DMSO. [VBBI] [Tf$_2$N] is also soluble in ethyl ether.

The quaternization of N-butylimidazole with 2-bromoethyl methacrylate was slow and difficult to get high yield of [MABI][Br]. After the anion exchange, [MABI][BF$_4$] is also a liquid at room temperature and soluble in above polar solvents but insoluble in ethyl ether and other nonpolar solvents.

All above ionic liquid monomers, unlike their corresponding chloride salts, are insoluble in water. So unreacted chloride salts could be easily removed by washing with water. Silver nitrate tests indicated that no chloride was present in all the ionic liquid monomers.

The poly(ionic liquid)s, except for P[BIEO][BF$_4$] which was synthesized by the polymer reaction shown in FIG. 6, were prepared by free radical polymerization of the ionic liquid monomers using AIBN as initiators. DMF was used as solvent because all poly(ionic liquid)s are soluble in it. All these ionic liquid monomers are easily polymerized with high conversions. Poly(ionic liquid)s were precipitated in methanol to remove unreacted monomers. DMF residue in polymers was removed by drying at 100° C. under vacuum. All poly(ionic liquid)s can dissolve in DMF, DMSO, acetonitrile, but are insoluble in water, dichloromethane and toluene. H¹ NMR and element analysis indicated the poly(ionic liquid)s were pure.

Example 2

Materials 4-vinylbenzyl chloride (90%), 1-methylimidazole (98%), lithium trifluoromethane sulfonimide 99.95%, potassium hexafluorophosphate 98%, sodium tetrafluoroborate (98%), 2,6-Di-tert-butyl-4-methyl phenol (98%) (DBMP), N,N-Dimethylformamide (99.8%) (DMF), acetonitrile (99.5+%), acetone (99.5+%), aqueous [2-(methacryloyloxy)ethyl]trimethyl ammonium chloride solution (75 wt. %), (p-vinylbenzyl)trimethylammonium chloride (98%), triethylamine (99.5%), tributylamine (99.5%) triphenylphosphine 99%, α,α'-azobis(isobutyrobitrile)(AIBN) (98%) were purchased from Aldrich. 1-methyl imidazole 99%, o-Benzoic sulphimide sodium salt hydrate (97%) were purchased from Lancaster Synthesis Inc. Pyridine was purchased from Fisher scientific. All chemicals were used as received.

Synthesis and Characterization (p-vinylbenzyl)trimethyl ammonium tetrafluoroborate ([VBTMA][BF$_4$]) and 2-(methacryloyloxy)ethyltrimethylamnonium tetrafluoroborate ([MATMA][BF$_4$]) were synthesized as described previously [Tang, J. B.; Sun, W. L.; Tang, H. D. Radosz, M.; Shen, Y. Chem. Commun. 2005, 3325-3327] using (p-vinylbenzyl)triethyl phosphonium tetrafluoroborate ([VBTEP][BF$_4$]), (p-vinylbenzyl)triphenyl phosphonium tetrafluoroborate ([VBTPP][BF$_4$]).

The synthesis of (p-vinylbenzyl)triphenyl phosphonium tetrafluoroborate ([VBTPP][BF$_4$]), 1-(p-vinylbenzyl) pyridinium tetrafluoroborate ([VBP][BF$_4$]) and 1-(p-vinylbenzyl)-3-methyl-imidazolium tetrafluoroborate ([VBMI][BF$_4$]) is similar to 1-(p-vinylbenzyl)-3-butyl-imidazolium tetrafluoroborate ([VBBI][BF$_4$]) [VBBI][BF$_4$] (VBIT), as reported previously [Tang, H.; Tang, J.; Radosz, M.; Shen, Y. J Polym Sci Part A: Poly Chem 2005, 43, 1432-1443], using triphenylphosphine, pyridine and 1-methyl imidazole instead of 1-butylimidazole, respectively.

The synthesis of (p-vinylbenzyl)triethylammonium tetrafluoroborate [VBTEA][BF$_4$] and (p-vinyl benzyl)tributylammonium tetrafluoroborate [VBTBA][BF$_4$] was follows: In a 50 ml flask, 4-vinylbenzyl chloride (6.1 g, 0.04 mol) and triethylamine (4.2 g, 0.042 mol) mol were mixed and heated at 50° C. under N$_2$ atmosphere for 2 days. The formed solid was washed with diethyl ether. The resultant white solid (8.5 g, 0.033 mol) was mixed with NaBF$_4$ (3.8 g, 0.035) in 50 acetonitrile and stirred at room temperature for 2 days. The salt precipitate was removed by filtration. The filtrate was concentrated and poured into 200 ml diethyl ether to precipitate out product. White crystal precipitate was formed, collected by filtration, and dried under vacuum. The total yield was 9.2 g (75%). [VBTBA][BF$_4$] was synthesized according to a similar procedure with yield of 64%.

In the synthesis of bis[(p-vinylbenzyl)dimethylammonium]ethane, [BVDEA][BF$_4$], which is an ionic liquid crosslinker, tetramethylethylenediamine (5.8 g, 0.05 mol), 4-vinylbenzyl chloride (16.0 g, 0.105 mol) and 0.1 g DBMP were mixed in 50 ml DMF. The resulting solution was heated at 50° C. for 2 days. The solution was poured into 400 ml diethyl ether to precipitate out the product. After filtration and drying under vacuum, 15.8 g white crystal product was obtained. The product was reacted with NaBF$_4$ (4.3 g, 0.04 mol) in 50 ml dried acetonitrile for 2 days. After the reaction, the insoluble chloride salt was removed by filtration. The product was collected by filtration and dried under vacuum. The overall yield was 16.7 g (63.7%).

Poly(ionic liquid)s were synthesized by free radical polymerization using AIBN as initiator in DMF as described in Example 1. The crosslinked P[VBTMA][BF$_4$] was synthesized in the same way except for adding 5 wt % of the crosslinker.

The polymers were characterized by ¹H NMR on a Bruker Advance DRX-400 spectrometer using d⁶-dimethylsulfoxide (DMSO-d⁶) as solvent. The elemental analyses of polymers were tested by Midwest Microlab LLC (US).

The ¹H NMR and elemental analyses indicated that the ionic liquid monomers and poly(ionic liquid)s obtained were pure.

Example 3

Materials

Bis(2-hydroxyethyl)dimethyl ammonium chloride (Acros, 99%), 2,2-Bis(bromomethyl)-1,3-propanediol (Aldrich, 98%), 1-Methylimidazole (Lancaster, 99%), 1-Butylimidazole (Aldrich, 98%), 1,1-Carbonyldiimidazole (Aldrich, reagent grade), terephthaloyl chloride (Aldrich, 99+%), sodium tetrafluoroborate (Aldrich, 98%, NaBF$_4$), dimethyl sulfoxide (Aldrich, 99.9+%, DMSO) and methanol (A.C.S. reagent) were used as received. Acetonitrile (Aldrich, 99.5+ %), N,N-Dimethylformamide (Aldrich, 99.8%, DMF) and triethylamine (EMD, 99.5%, Et$_3$N) were used after removing water by molecular sieves.

Synthesis and Characterization

Figure 7:
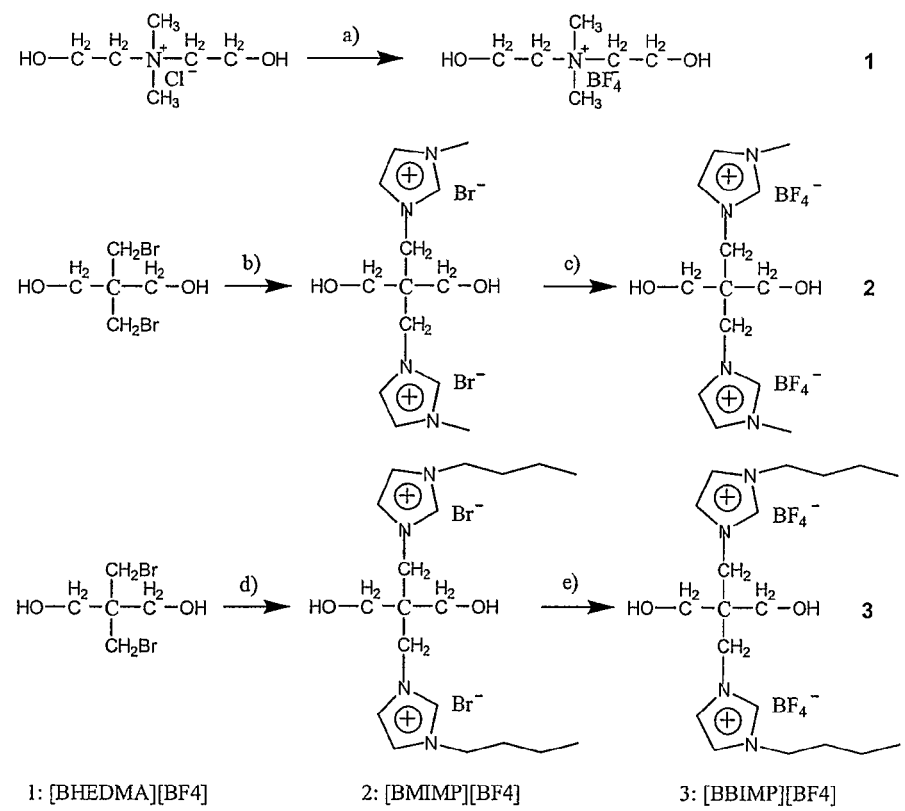
FIG. 7 is the scheme of the synthesis of the monomers, Bis(2-hydroxyethyl)dimethyl ammonium tetrafluoroborate ([BHEDMA][$BF_4$]) 1, 2,2-Bis(methylimidazoliun methyl)-1,3-propanediol tetrafluoroborate ([BMIMP][$BF_4$]) 2 and 2,2-Bis(butylimidazolium methyl)-1,3-propanediol tetrafluoroborate ([BBIMP][$BF_4$]) 3.

The synthesis of the monomers, Bis(2-hydroxyethyl)dimethyl ammonium tetrafluoroborate ([BHEDMA][BF$_4$]) 1, 2,2-Bis(methylimidazolium methyl)-1,3-propanediol tetrafluoroborate ([BMIMP][BF$_4$]) 2 and 2,2-Bis(butylimidazolium methyl)-1,3-propanediol tetrafluoroborate ([BBIMP] [BF$_4$]) 3 are shown in FIG. 7. The reagents and conditions were: a) NaBF$_4$, acetonitrile, room temperature, 48 h, 96%; b) 1-Methylimidazole, N$_2$, 60° C., 24 h, 98%; c) NaBF$_4$, acetonitrile, room temperature, 48 h, 96%; d) 1-Butylimidazole, N$_2$, 80° C., 24 h, 97%; d) NaBF$_4$, acetonitrile, room temperature, 48 h, 96%. Monomer 1 is an ammonium-based ionic liquid, while 2 and 3 are imidazolium-based ionic liquids.

The synthesis of polycarbonate (PC) and polyethylene terephthalate (PET) types of ionic liquid polymers by condensation polymerization is as follows. The PC type of ionic liquid polymers can be synthesized using the monomers 1 (2 or 3) reacted with 1,1-carbonyldiimidazole. The PET type of ionic liquid polymers can be synthesized using the monomers 1 (2 or 3) reacted with terephthaloyl chloride, respectively. Both kinds of condensation polymerizations required a strict 1:1 ratio of the reagents with different difunctional groups. All the reactions were carried out in DMF at 60° C. for 24 h. All the polymers were precipitated by methanol after polymerization and dried under vacuum at 50° C.

The ionic liquid monomer 1 is colorless, while 2 and 3 have a light yellow color. Synthesis of 2 and 3 in a N$_2$ atmosphere is necessary because the imidazole group is liable to be oxidized by the O$_2$ in the air, which will make the product have a brown color. For the 1-methylimidazole is more active than 1-butylimidazole, it will react with 2,2-Bis(bromomethyl)-1,3-propanediol at a lower temperature (60° C.) than that of the 1-Butylimidazole (80° C.). All the monomers (1, 2 and 3) are viscous liquids, and they all absorb moisture quickly when contacting air, so all of them need to be dried in a rotating evaporator before the polymerization.

Figure 8:
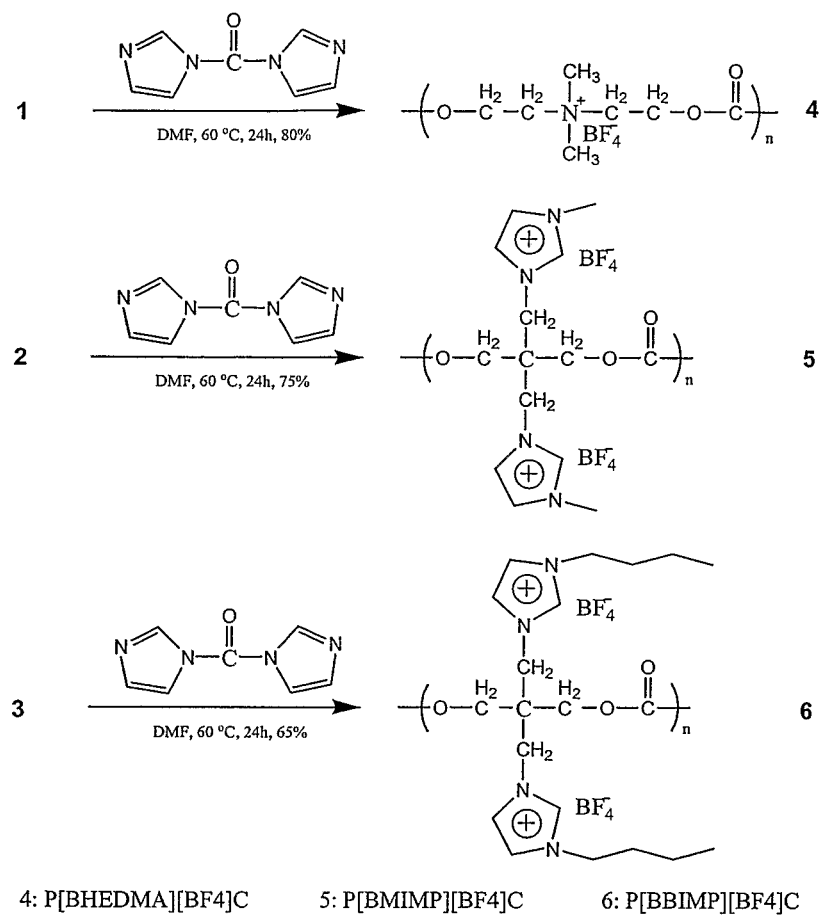
FIG. 8 is the scheme of the polycondensation synthesis of the PC type polymers, poly(bis(2-hydroxyethyl)dimethyl ammonium tetrafluoroborate) carbonate (P[BHEDMA][$BF_4$]C)4, poly(2,2-Bis(methylimidazolium methyl)-1,3-propanediol tetrafluoroborate) carbonate (P[BMIMP][$BF_4$]C)$_5$, and poly(2,2-Bis(butylimidazolium methyl)-1,3-propanediol tetrafluoroborate) carbonate (P[BBIMP][$BF_4$]C) 6.

The polycondensation synthesis of the PC type polymers, poly(bis(2-hydroxyethyl)dimethyl ammonium tetrafluoroborate) carbonate (P[BHEDMA][BF4]C) 4, poly(2,2-Bis(methylimidazolium methyl)-1,3-propanediol tetrafluoroborate) carbonate (P[BMIMP][BF$_4$]C) 5, and poly(2,2-Bis(butylimidazolium methyl)-1,3-propanediol tetrafluoroborate) carbonate (P[BBIMP][BF$_4$]C) 6 are shown in FIG. 8. Polymer 4 is white, while 5 and 6 have a light yellow color. At room temperature, all polymers are easily crashed into fine powders. Polymer 4 is soluble in acetonitrile, and polymer 5 and 6 are soluble in chloroform.

Figure 9:
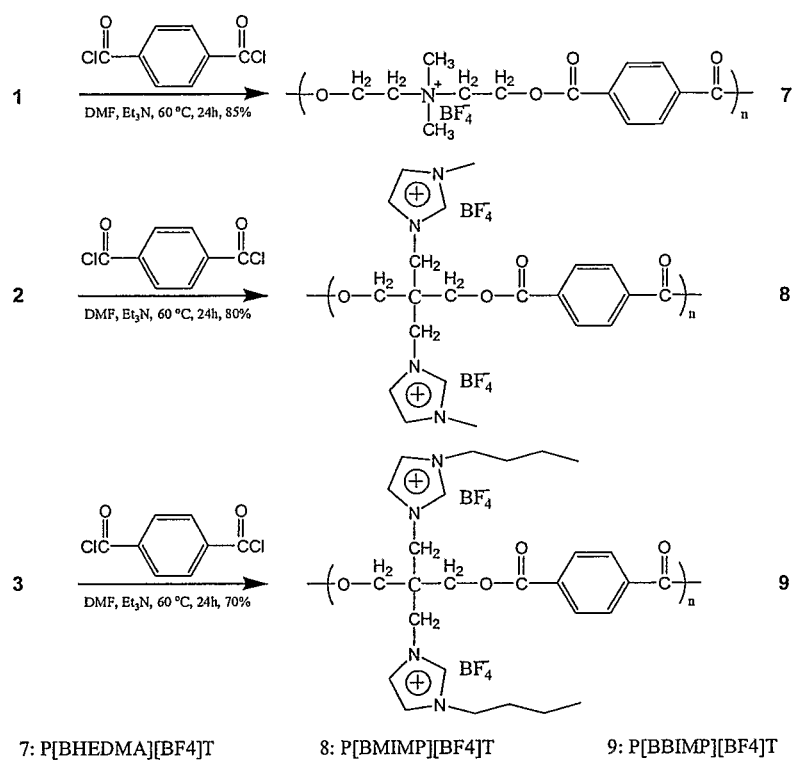
FIG. 9 is the scheme of the synthesis of the PET type polymers, poly(Bis(2-hydroxyethyl)dimethyl ammonium tetrafluoroborate) terephthalate (P[BHEDMA][BF4]T)7, poly(2,2-Bis(methylimidazolium methyl)-1,3-propanediol tetrafluoroborate) terephthalate (P[BMIMP][BF$_4$]T) 8 and poly(2,2-Bis(butylimidazolium methyl)-1,3-propanediol tetrafluoroborate) terephthalate (P[BBIMP][BF$_4$]T) 9.

The synthesis of the PET type polymers, poly(Bis(2-hydroxyethyl)dimethyl ammonium tetrafluoroborate) terephthalate (P[BHEDMA][BF4]T) 7, poly(2,2-Bis(methylimidazolium methyl)-1,3-propanediol tetrafluoroborate) terephthalate (P[BMIMP][BF$_4$]T) 8 and poly(2,2-Bis(butylimidazolium methyl)-1,3-propanediol tetrafluoroborate) terephthalate (P[BBIMP][BF$_4$]T) 9 are shown in FIG. 9. Triethylamine was added to the reaction system slowly to remove the hydrogen chloride. The obtained three polymers (7, 8 and 9) are all white powders.

Example 4

Microwave Absorption Characterization

The ionic homopolymers and copolymers have high microwave absorption capacity due to the presence of high concentration of anions and cations. Tables 1 and 2 show specific results for sample polymers, for example permittivity (EPS), permeability (Mu), and relative loss (tan δ), which is the ratio of the imaginary permittivity to the real permittivity. Materials were cast into membranes, and carefully cut to fit in a Maury Microwave xband and sband waveguide. Using an Agilent 8510 network analyzer, forward and reverse s-parameters were recorded. The measured s parameters were normalized to a standard reference plane via a second calibration measurement. The resulting s parameters were converted to real and imaginary permittivities and permeabilities using algorithms developed by Nicolson-Ross-Weir [Nicolson, A. M.; and Ross, G. F., "Measurement of the intrinsic properties of materials by time domain techniques," IEEE Trans. Instrum. Meas., vol. IM-19, pp. 377-382, November 1970; Weir, W. B., "Automatic measurement of complex dielectric constant and permeability at microwave frequencies," Proc. IEEE, vol. 62, pp. 33-36, January 1974]. The polymers shown in Tables 1 and 2 exhibit strong permittivity but happen to exhibit low or no permeability. However, polymers with metal-containing anions, such as $FeCl_4^-$, $NiCl^{2-}$, and other anions, exhibit permeability as well. Another approach to increasing permeability is to disperse magnetic nanoparticles in the polymer. As a result of having high relative loss, and hence high microwave absorption capacity, such polymers have numerous military and nonmilitary applications, for example, in radar absorbing coatings and other shapes, in mines detection, and in artificial human tissue (where the challenge is to match the permittivity of human tissue). The advantage of the polymeric materials, relative to the non-polymeric state of the art materials, is that they can easily be fabricated into various shapes of desirable characteristics, for example mechanical properties and excellent thermal stability, and used in coating formulations.

TABLE 1

The microwave absorption capacity (average values) of poly[1-(p-vinylbenzyl-3-butyl-imidazolium tetrafluroborate] (P[VBBI][BF$_4$]$^-$)

| Frequency | EPS-R[1] | EPS-I[2] | Mu-R[3] | Mu-I[4] |
|---|---|---|---|---|
| 2.50 | 4.62 | −.37 | 1.13 | −.08 |
| 2.69 | 4.63 | −.37 | 1.08 | −.07 |
| 2.88 | 4.62 | −.37 | 1.06 | −.06 |
| 3.06 | 4.61 | −.37 | 1.06 | −.05 |
| 3.25 | 4.60 | −.36 | 1.06 | −.04 |
| 3.44 | 4.59 | −.35 | 1.06 | −.04 |
| 3.63 | 4.60 | −.35 | 1.05 | −.03 |
| 3.81 | 4.60 | −.35 | 1.05 | −.02 |
| 4.00 | 4.59 | −.36 | 1.06 | −.03 |
| 8.00 | 4.36 | −.26 | 1.06 | .02 |
| 8.50 | 4.36 | −.26 | 1.07 | −.01 |
| 9.00 | 4.36 | −.27 | 1.05 | −.01 |
| 9.50 | 4.36 | −.27 | 1.05 | −.02 |
| 10.00 | 4.36 | −.27 | 1.04 | −.01 |
| 10.50 | 4.35 | −.27 | 1.04 | −.01 |
| 11.00 | 4.35 | −.27 | 1.03 | −.01 |
| 11.50 | 4.35 | −.27 | 1.03 | .00 |
| 12.00 | 4.37 | −.31 | 1.04 | −.01 |

[1]Magnetic permittivity, real
[2]Magnetic permittivity, imaginary
[3]Magnetic permeability, real
[4]Magnetic permeability, imaginary

TABLE 2

Microwave absorption capacity of other polymers

| | Frequency | | | | | |
|---|---|---|---|---|---|---|
| | 1.4 GH | | | 2.05 GH | | |
| Material | EPS-R | EPS-I | Tan δ | EPS-R | EPS-I | Tan δ |
| P[VBBI][BF$_4$] | 3.50 | 0.16 | 0.046 | 3.42 | 0.16 | 0.048 |
| P[VBBI][SAC] | 4.60 | 0.21 | 0.046 | 4.48 | 0.21 | 0.047 |
| P[VBTMA][BF$_4$]/PEG Copolymer (50/50 wt/wt) | 5.26 | 0.79 | 0.15 | 4.74 | 0.72 | 0.153 |

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:
1. A method of forming a polymer, comprising polymerizing an ionic liquid monomer to which has been added metal containing ions under conditions such that it has enhanced permeability to electromagnetic radiation in the radio frequency band.
2. A method as defined in claim 1, wherein the ionic liquid monomer comprises an organic salt that upon polymerization has a melting point below about 200° C.
3. A method as defined in claim 2, wherein the organic salt comprises an inorganic moiety.
4. A method as defined in claim 1, wherein the ionic liquid monomer is selected from the group consisting of:

(a) imidazolium-based ionic liquids, consisting of 1-[2-(methacryloyloxy)ethyl]-3-butyl-imidazolium tetrafluoroborate ([MABI][BF$_4$]), 1-(p-vinylbenzyl)-3-butyl-imidazolium tetrafluoroborate ([VBBI][BF$_4$]), 1-(p-vinylbenzyl)-3-methyl-imidazolium tetrafluoroborate [VBMI][BF$_4$],1-(p-vinylbenzyl)-3-butyl-imidazolium hexafluorophosphate [VBBI][PF$_6$], 1-(p-vinylbenzyl)-3-butyl-imidazolium o-benzoic sulphimide ([VBBI][Sac]), 1-(p-vinylbenzyl)-3-butyl-imidazolium trifluoromethane sulfonamide ([VBBI][BF$_4$]), and (1-butylimidazolium-3)methyl-ethylene oxide ([BIEO][BF$_4$]);

(b) ammonium-based ionic liquids, consisting of (p-vinylbenzyl)trimethyl ammonium tetrafluoroborate ([VBTMA][BF$_4$]), (p-vinylbenzyl)triethyl ammonium tetrafluoroborate ([VBTEA][BF$_4$]), (p-vinylbenzyl) tributyl ammonium tetrafluoroborate ([VBTBA][BF$_4$]), 2-(methacryloyloxy)ethyltrimethylamnonium tetrafluoroborate ([MATMA][BF$_4$]), (p-vinylbenzyl)trimethyl ammonium hexafluorophosphate ([VBTMA][PF$_6$]), (p-vinylbenzyl)trimethyl ammonium o-benzoic sulphimide ([VBTMA][Sac]), and (p-vinylbenzyl)trimethyl ammonium trifluoromethane sulfonamide ([VBTMA][Tf$_2$N]);

(c) phosphonium-based ionic liquids, consisting of (p-vinylbenzyl)triethyl phosphonium tetrafluoroborate ([VBTEP][BF$_4$]), and (p-vinylbenzyl)triphenyl phosphonium tetrafluoroborate ([VBTPP][BF$_4$]);

(d) pyridinium-based ionic liquids, consisting of 1-(p-vinylbenzyl) pyridinium tetrafluoroborate ([VBP][BF$_4$]) and (e) condensation polymerization ionic monomers, consisting of bis(2-hydroxyethyl)dimethyl ammonium tetrafluoroborate ([BHEDMA][BF$_4$]), 2,2-bis(methylimidazolium methyl)-1,3-propanediol tetrafluoroborate ([BMIMP][BF$_4$]), and 2,2-bis(butylimidazolium methyl)-1,3-propanediol tetrafluoroborate ([BBIMP][BF$_4$]).

5. A method as defined in claim 1, wherein the polymerization is a polymerization method selected from the group consisting of free radical polymerization and condensation polymerization.

6. A method of forming a polymer, comprising polymerizing an ionic liquid monomer to which has been magnetic nanoparticles under conditions such that it has enhanced permeability to electromagnetic radiation in the radio frequency band.

7. A method as defined in claim 1, wherein the ionic liquid monomer comprises an organic salt that upon polymerization has a melting point below about 200° C.

8. A method as defined in claim 2, wherein the organic salt comprises an inorganic moiety.

9. A method as defined in claim 1, wherein the ionic liquid monomer is selected from the group consisting of:

(a) imidazolium-based ionic liquids, consisting of 1-[2-(methacryloyloxy)ethyl]-3-butyl-imidazolium tetrafluoroborate ([MABI][BF$_4$]), 1-(p-vinylbenzyl)-3-butyl-imidazolium tetrafluoroborate ([VBBI][BF$_4$]), 1-(p-vinylbenzyl)-3-methyl-imidazolium tetrafluoroborate [VBMI][BF$_4$],1-(p-vinylbenzyl)-3-butyl-imidazolium hexafluorophosphate [VBBI][PF$_6$], 1-(p-vinylbenzyl)-3-butyl-imidazolium o-benzoic sulphimide ([VBBI][Sac]), 1-(p-vinylbenzyl)-3-butyl-imidazolium trifluoromethane sulfonamide ([VBBI][BF$_4$]), and (1-butylimidazolium-3)methyl-ethylene oxide ([BIEO][BF$_4$]);

(b) ammonium-based ionic liquids, consisting of (p-vinylbenzyl)trimethyl ammonium tetrafluoroborate ([VBTMA][BF$_4$]), (p-vinylbenzyl)triethyl ammonium tetrafluoroborate ([VBTEA][BF$_4$]), (p-vinylbenzyl) tributyl ammonium tetrafluoroborate ([VBTBA][BF$_4$]), 2-(methacryloyloxy)ethyltrimethylamnonium tetrafluoroborate ([MATMA][BF$_4$]), (p-vinylbenzyl)trimethyl ammonium hexafluorophosphate ([VBTMA][PF$_6$]), (p-vinylbenzyl)trimethyl ammonium o-benzoic sulphimide ([VBTMA][Sac]), and (p-vinylbenzyl)trimethyl ammonium trifluoromethane sulfonamide ([VBTMA][Tf$_2$N]);

(c) phosphonium-based ionic liquids, consisting of (p-vinylbenzyl)triethyl phosphonium tetrafluoroborate ([VBTEP][BF$_4$]), and (p-vinylbenzyl)triphenyl phosphonium tetrafluoroborate ([VBTPP][BF$_4$]);

(d) pyridinium-based ionic liquids, consisting of 1-(p-vinylbenzyl) pyridinium tetrafluoroborate ([VBP][BF$_4$]) and (e) condensation polymerization ionic monomers, consisting of bis(2-hydroxyethyl)dimethyl ammonium tetrafluoroborate ([BHEDMA][BF$_4$]), 2,2-bis(methylimidazolium methyl)-1,3-propanediol tetrafluoroborate ([BMIMP][BF$_4$]), and 2,2-bis(butylimidazolium methyl)-1,3-propanediol tetrafluoroborate ([BBIMP][BF$_4$]).

10. A method as defined in claim 1, wherein the polymerization is a polymerization method selected from the group consisting of free radical polymerization and condensation polymerization.

* * * * *